US011979747B2

United States Patent
Xu et al.

(10) Patent No.: US 11,979,747 B2
(45) Date of Patent: May 7, 2024

(54) METHOD OR DEVICE FOR INTEGRITY PROTECTION

(71) Applicant: GUANGDONG OPPO MOBILE TELECOMMUNICATIONS CORP., LTD., Dongguan (CN)

(72) Inventors: Yang Xu, Dongguan (CN); Qianxi Lu, Dongguan (CN); Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 540 days.

(21) Appl. No.: 17/216,637

(22) Filed: Mar. 29, 2021

(65) Prior Publication Data
US 2021/0243606 A1  Aug. 5, 2021

Related U.S. Application Data

(63) Continuation of application No. PCT/CN2019/084607, filed on Apr. 26, 2019.

(51) Int. Cl.
*H04W 12/106* (2021.01)
*H04W 92/18* (2009.01)

(52) U.S. Cl.
CPC .......... *H04W 12/106* (2021.01); *H04W 92/18* (2013.01)

(58) Field of Classification Search
CPC ..... H04W 72/23; H04W 80/02; H04W 76/11; H04W 12/106; H04W 92/18
See application file for complete search history.

(56) References Cited

U.S. PATENT DOCUMENTS 9,420,468 B2 * 8/2016 Mukherjee ............ H04L 63/123
2007/0258591 A1 * 11/2007 Terry .................. H04L 63/0428
380/247

(Continued)

FOREIGN PATENT DOCUMENTS

CN           1363195 A      8/2002
CN         102404721 A      4/2012
(Continued)

OTHER PUBLICATIONS

Maruko et al., "Packet Collision Reduction Scheme for LTE V2X Sidelink Communications," 2018 IEEE 88th Vehicular Technology Conference (VTC-Fall) Year: 2018 | Conference Paper | Publisher: IEEE.*

(Continued)

*Primary Examiner* — Roderick Tolentino
(74) *Attorney, Agent, or Firm* — BAYES PLLC (57) ABSTRACT

The present disclosure is related to an integrity protection method and device. In the method, a first BEARER parameter value is obtained based on at least one of the following: a LCID corresponding to data transmitted in the sidelink communication, an access communication standard adopted by the sidelink communication, a BEARER parameter value allocated for the sidelink communication, or a preset BEARER parameter value. A bit length of the LCID corresponding to the transmitted data is greater than a bit length of the first BEARER parameter value. Based on the first BEARER parameter value, a MAC-I or an XMAC-I for the sidelink communication is calculated.

15 Claims, 4 Drawing Sheets

(56) References Cited

U.S. PATENT DOCUMENTS

| | | | |
|---|---|---|---|
| 2017/0181206 A1 | 6/2017 | Lee et al. | |
| 2018/0368194 A1* | 12/2018 | Tang | H04W 76/27 |
| 2019/0069308 A1 | 2/2019 | Lee et al. | |
| 2019/0306764 A1* | 10/2019 | da Silva | H04W 36/0079 |
| 2019/0320316 A1* | 10/2019 | Mildh | H04W 80/08 |
| 2020/0169887 A1* | 5/2020 | Wager | H04W 76/27 |
| 2020/0205003 A1* | 6/2020 | Ingale | H04W 12/04 |
| 2020/0296588 A1* | 9/2020 | Yang | H04W 76/27 |
| 2020/0403731 A1* | 12/2020 | Zhang | H04W 76/14 |
| 2021/0153021 A1* | 5/2021 | Kimba Dit Adamou | H04W 12/106 |

FOREIGN PATENT DOCUMENTS

| | | |
|---|---|---|
| CN | 102647332 A | 8/2012 |
| CN | 104125570 A | 10/2014 |
| CN | 109547396 A | 3/2019 |
| CN | 112655236 A | 4/2021 |
| WO | 01/63954 A1 | 8/2001 |
| WO | 2019061180 A1 | 4/2019 |

OTHER PUBLICATIONS

Bonjorn et al., "Cooperative Resource Allocation and Scheduling for 5G eV2X Services," IEEE Access Year: 2019 | vol. 7 | Journal Article | Publisher: IEEE.*
Extended European Search Report issued in corresponding European Application No. 19926622.2, dated Jul. 30, 2021.
"3rd Generation Partnership Project; Technical Specification Group Radio Access Network; Evolved Universal Terrestrial Radio Access (E-UTRA); Packet Data Convergence Protocol (PDCP) specification (Release 13)", 3GPP TS 36.323 V13.2.1 (Jun. 2016), 39 pages.
"3rd Generation Partnership Project; Technical Specification Group Services and System Aspects; 3GPP System Architecture Evolution (SAE); Security architecture (Release 13)", 3GPP TS 33.401 V13.3.0 (Jun. 2016), 148 pages.
WO, International Search Report, PCT/CN2019/084607, dated Feb. 6, 2020, 31 pages.
PCT Written Opinion of the International Searching Authority issued in corresponding International Application No. PCT/CN2019/084607, dated Feb. 6, 2020, 9 pages.
First Office action issued in corresponding India Application No. 202127013126, dated Feb. 7, 2022, 6 pages.
First Office Action issued in corresponding Chinese Application No. 202110438087.0, dated Jul. 21, 2022.

* cited by examiner

Obtain, by a terminal device, a first BEARER parameter value based on at least one of the following: a LCID corresponding to data transmitted in the sidelink communication, an access communication standard adopted by the sidelink communication, a BEARER parameter value allocated for the sidelink communication, or a preset BEARER parameter value, wherein a bit length of the LCID corresponding to the transmitted data is greater than a bit length of the first BEARER parameter value  ⟵ 210

Based on the first BEARER parameter value, calculate, by the terminal device, MAC-I or XMAC-I for the sidelink communication  ⟵ 220

```
┌─────────────────────────────────────────────────────────────────┐
│   Obtain, by a communication device, a first BEARER parameter   │ ─ 310
│ value based on at least one of the following: a bit length of a │
│ LCID for a sidelink communication, a BEARER parameter value     │
│ allocated for the Uu interface communication, or a preset       │
│ BEARER parameter value                                          │
└─────────────────────────────────────────────────────────────────┘
                                │
┌─────────────────────────────────────────────────────────────────┐
│   Based on the first BEARER parameter value, calculate, by the  │ ─ 320
│ communication device, MAC-I or XMAC-I for the Uu interface      │
│ communication                                                   │
└─────────────────────────────────────────────────────────────────┘
```

METHOD OR DEVICE FOR INTEGRITY PROTECTION

CROSS-REFERENCE TO RELATED APPLICATIONS

This application is a continuation application of International Application No. PCT/CN2019/084607, filed Apr. 26, 2019, the entire contents of which are incorporated herein by reference.

BACKGROUND

Embodiments of the present disclosure generally relate to communication technologies, and more particularly, to a method or device for integrity protection.

In wireless communications, a key can be used for integrity protection at the Packet Data Convergence Protocol (PDCP) layer.

How to implement the integrity protection of the PDCP layer is an urgent problem to be solved.

SUMMARY

Embodiments of the present disclosure provide an integrity protection method or device for a sidelink communication or a Uu interface communication, which can implement the integrity protection of the PDCP layer, thereby improving security of communications.

According to a first aspect, there is provided an integrity protection method for a sidelink communication, including: obtaining a first BEARER parameter value based on at least one of the following: a logical channel identity (LCD) corresponding to data transmitted in the sidelink communication, an access communication standard adopted by the sidelink communication, a BEARER parameter value allocated for the sidelink communication, or a preset BEARER parameter value, wherein a bit length of the LCD corresponding to the transmitted data is greater than a bit length of the first BEARER parameter value; and based on the first BEARER parameter value, calculating a Message Authentication Code-Integrity (MAC-I) or an eXpected Message Authentication Code-Integrity (XMAC-I) for the sidelink communication.

According to a second aspect, there is provided an integrity protection method for a Uu interface communication, including: obtaining a first BEARER parameter value based on at least one of the following: a bit length of a logical channel identity (LCD) for a sidelink communication, a BEARER parameter value allocated for the Uu interface communication, or a preset BEARER parameter value; and based on the first BEARER parameter value, calculating a Message Authentication Code-Integrity (MAC-I) or an eXpected Message Authentication Code-Integrity (XMAC-I) for the Uu interface communication.

According to a third aspect, there is provided an integrity protection device for a sidelink communication configured to perform the method according to the first aspect.

Specifically, the integrity protection device for a sidelink communication includes functional modules configured to perform the method according to the first aspect.

According to a fourth aspect, there is provided an integrity protection device for a Uu interface communication configured to perform the method according to the second aspect.

Specifically, the integrity protection device for a Uu interface communication includes functional modules configured to perform the method according to the second aspect.

According to a fifth aspect, there is provided an integrity protection device for a sidelink communication, including a processor and a memory. The memory is configured to store a computer program, and the processor is configured to call and run the computer program stored in the memory to perform the method according to the first aspect.

According to a sixth aspect, there is provided an integrity protection device for a Uu interface communication, including a processor and a memory. The memory is configured to store a computer program, and the processor is configured to call and run the computer program stored in the memory to perform the method according to the second aspect.

According to a seventh aspect, there is provided a chip configured to implement the method according to any one of the first to second aspects.

Specifically, the chip includes a processor configured to call and run a computer program stored in a memory to cause a device in which the chip is installed to perform the method according to any one of the first to second aspects.

According to an eighth aspect, there is provided a computer-readable storage medium configured to store a computer program, wherein the computer program is configured to cause a computer to perform the method according to any one of the first to second aspects.

According to a ninth aspect, there is provided a computer program product including computer program instructions that cause a computer to perform the method according to any one of the first to second aspects.

According to a tenth aspect, there is provided a computer program. When the computer program is run on a computer, the computer is caused to perform the method according to any one of the first to second aspects.

By using the above technical solutions, a first BEARER parameter value is obtained based on at least one of the following: a logical channel identity (LCD) corresponding to data transmitted in the sidelink communication, an access communication standard adopted by the sidelink communication, a BEARER parameter value allocated for the sidelink communication, or a preset BEARER parameter value, wherein a bit length of the LCD corresponding to the transmitted data is greater than a bit length of the first BEARER parameter value. Based on the first BEARER parameter value, a Message Authentication Code-Integrity (MAC-I) or an eXpected Message Authentication Code-Integrity (XMAC-I) for the sidelink communication is calculated. In this way, the integrity protection of the PDCP layer based on the sidelink communication can be implemented, thereby improving security of communications.

Or a first BEARER parameter value is obtained based on at least one of the following: a bit length of a logical channel identity (LCD) for a sidelink communication, a BEARER parameter value allocated for the Uu interface communication, or a preset BEARER parameter value. Based on the first BEARER parameter value, a Message Authentication Code-Integrity (MAC-I) or an eXpected Message Authentication Code-Integrity (XMAC-I) for the Uu interface communication is calculated. In this way, the integrity protection of the PDCP layer based on the Uu interface communication can be implemented, thereby improving security of communications.

DETAILED DESCRIPTION

The technical solutions of embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system or a 5G system, etc.

The network device mentioned in embodiments of the present disclosure may be a device that communicates with a terminal device (or called a communication terminal or a terminal). The network device can provide communication coverage for a specific geographic area and can communicate with terminal devices in the coverage area. According to embodiments, the network device may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a base station (gNB) in a new radio system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The terminal device mentioned in embodiments of the present disclosure may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM A broadcast transmitter; and/or the terminal device is connected via a device of another terminal device which is configured to receive/send communication signals; and/or the terminal device is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved PLMN, etc.

Figure 1:
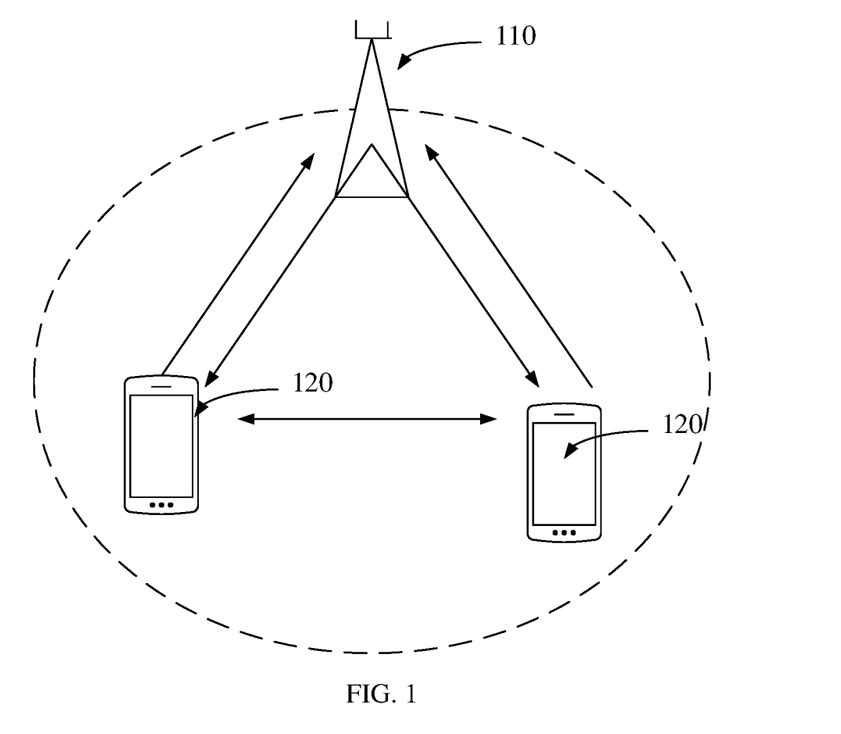
FIG. 1 is a schematic diagram of communication system architecture according to an embodiment of the present disclosure.

In embodiments of the present disclosure, as shown in FIG. 1, the terminal device 120 and the network device 110 can communicate with each other, and according to some embodiments, the communication can be carried out through a Uu interface, and/or a terminal device 120 and another terminal device 120 can communicate with each other via the sidelink (SL). The communication between a terminal device 120 and another terminal device 120 via a sidelink can also be referred to as communication using a PC5 interface. The sidelink communication in embodiments of the present disclosure may be used for communication of the following services: Vehicle to Anything (V2X), Network Controlled Interactive Services (NCIS), or Public Safety services.

Figure 2:
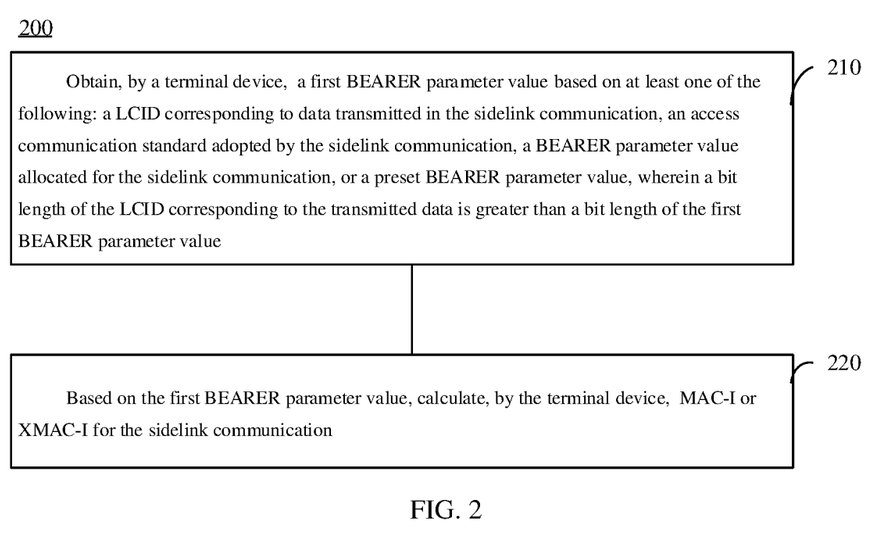
FIG. 2 is a schematic diagram of an integrity protection method for a sidelink communication according to an embodiment of the present disclosure.

FIG. 2 is a schematic flowchart of an integrity protection method 200 for a sidelink communication. The method 200 includes at least part of the following contents. The method 200 can be implemented by a terminal device.

Specifically, the method 200 can be implemented by a sending end of the sidelink communication. In this case, the terminal device as the sending end can be used to calculate a Message Authentication Code-Integrity (MAC-I). Alternatively, the method can be implemented by a receiving end of the sidelink communication. In this case, the terminal device as the receiving end can be used to calculate an eXpected Message Authentication Code-Integrity (XMAC-I).

In embodiments of the present disclosure, the bearer (BEARER) parameter value may be a parameter value used to obtain MAC-I or XMAC-I, and the bit length of the BEARER parameter value may be 5. The BEARER parameter value may be a parameter value with a fixed length, and the fixed length may be preset on the terminal device or may be configured by the network device for the terminal device. The BEARER parameter value may also have other names, such as a Logical Channel Identity (LCID) parameter value (for example, in the case that the parameter value is obtained based on the LCID), an input parameter value, etc., and embodiments of the present disclosure do not impose specific limitations on this.

The BEARER parameter value along with other parameters can be used to obtain MAC-I or XMAC-I.

The other parameters may include at least one of a PDCP count (COUNT) value, a direction of the sidelink communication, an integrity protection key, an integrity protection key identifier, and data packet content. In embodiments of the present disclosure, the algorithm for calculating MAC-I or XMAC-I may be a Network Integrity Algorithm (NIA).

Figure 3:
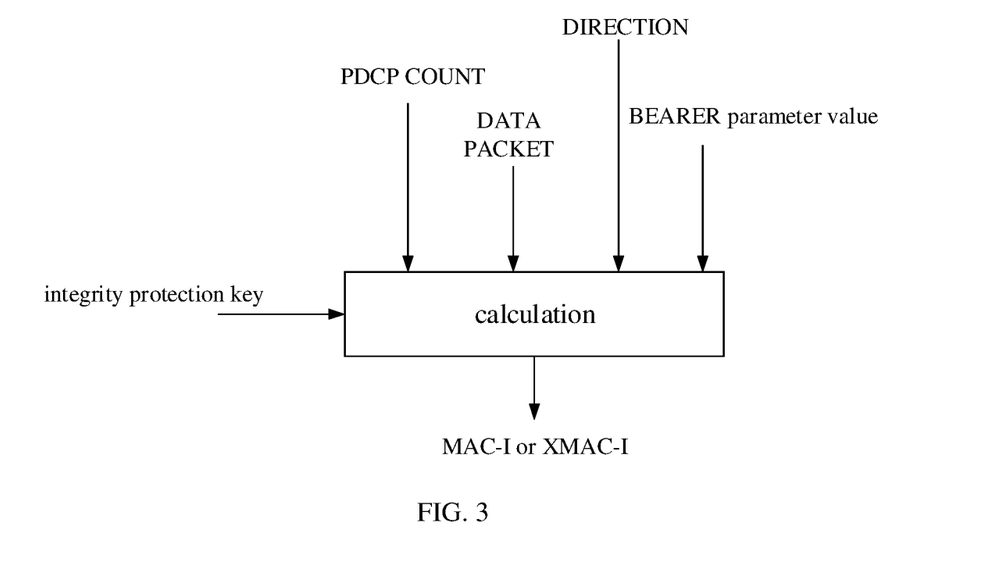
FIG. 3 is a schematic diagram showing calculation of MAC-I or XMAC-I according to an embodiment of the present disclosure.

For example, as shown in FIG. 3, the PDCP COUNT value, direction, integrity protection key, BEARER parameter value, and the integrity protection key can be input in the calculation unit to obtain MAC-I or XMAC-I.

The PDCP COUNT value can include 32 bits, bits 0-15 of the 32 bits are $K_{D\text{-}sess}$ ID, and $K_{D\text{-}sess}$ is generated by the root key of the terminal device with a per-session granularity; bits 16-31 are a Counter parameter value, and Counter is a counter which can be incremented by one each time a message is sent. The $K_{D\text{-}sess}$ ID and the Counter parameter value can be carried in a PDCP header. For user-plane communication, if integrity protection is not required, the terminal device can set the $K_{D\text{-}sess}$ ID and the Counter parameter value to 0. And, for signaling messages that are not to be protected, the $K_{D\text{-}sess}$ ID and the Counter parameter value can also be set to 0 in the PDCP message.

The integrity protection key can be Proximity Service (ProSe) encryption key (ProSe Encryption Key, PEK). The terminal device can have an algorithm identifier and a ProSe Group Key (PGK). The PGK can be the key corresponding to the group which the terminal device belongs to, and the terminal can derive a ProSe Traffic Key (PTK) based on the PGK. The PTK can be dedicated to the terminal device and can be carried in the header of a user datagram. The terminal device can derive ProSe Encryption Key (PEK) based on the PTK, and the PEK can be used to encrypt data. The bit length of the integrity protection key can be 128 bits.

The direction of the sidelink communication can be represented by one bit. The direction of the sidelink communication can include a direction from a terminal device that initiates the sidelink communication to a terminal device for which the sidelink communication is destined (the bit value corresponding to this direction can be 1), and a direction from a terminal device for which the sidelink communication is destined to a terminal device that initiates the sidelink communication (the bit value corresponding to this direction can be 0).

In 210, the terminal device obtains the first BEARER parameter value based on at least one of the following: a logical channel identity (LCID) corresponding to data transmitted in the sidelink communication, an access communication standard adopted by the sidelink communication, a BEARER parameter value allocated for the sidelink communication, or a preset BEARER parameter value, wherein a bit length of the LCID corresponding to the transmitted data is greater than a bit length of the first BEARER parameter value. For example, the bit length of the LCID is 6, and the bit length of the first BEARER parameter value is 5.

The LCID in embodiments of the present disclosure may be allocated by a network device or a terminal device (for example, the group head of a terminal device group to which the terminal device belongs in the sidelink communication, the sending end in the sidelink communication, or the receiving end in the sidelink communication); or, the LCID can be negotiated between the sending end and the receiving end in the sidelink communication. In embodiments of the present disclosure, the LCID may be allocated or negotiated when LC is established.

In some embodiments of the present disclosure, the bit length of the LCID corresponding to the transmitted data is greater than the first BEARER parameter value, but the present disclosure is not limited to this, and the bit length of the LCID may be smaller than the bit length of the first BEARER parameter value in some other embodiments. The above-mentioned factors need to be considered for obtaining the first BEARER parameter value. The terminal device may obtain the first BEARER parameter value based on one of the above factors or obtain the BEARER parameter value based on multiple of the factors. The following will give examples of how to obtain the BEARER parameter value.

In an implementation, the terminal device may obtain the first BEARER parameter value based on the LCID corresponding to the transmitted data.

When the bit length of the LCID is equal to the desired bit length of the BEARER parameter value, the LCID can be directly used as the BEARER parameter value. However, in some communication systems (for example, 5G communication systems), the bit length of the LCID may not be equal to the desired bit length of the BEARER parameter value. In order to solve the mismatch problem, the terminal device can process the LCID to obtain the first BEARER parameter value.

The processing performed on the LCID corresponding to the transmitted data may specifically include truncating a part of the bit values of the LCID corresponding to the transmitted data to generate the first BEARER parameter value.

The bit length of the LCID is greater than the desired bit length of the BEARER parameter value. If the first BEARER parameter value needs to be obtained based on the LCID, a part of the bit values of the LCID can be truncated as the first BEARER parameter value. Truncating a part of the bit values of the LCID as the first BEARER parameter value means that the part of the bit values is used to generate the first BEARER parameter value, and other bit values are discarded. The terminal device may truncate N lowest bit values or N highest bit values of the LCID corresponding to the transmitted data to generate the first BEARER parameter value. The N may be equal to the bit length of the first BEARER parameter value.

Figure 4:
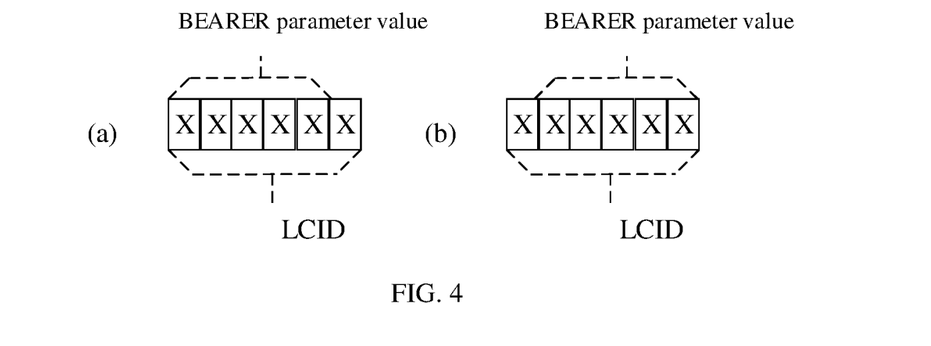
FIG. 4 is a schematic diagram of a method for obtaining a BEARER parameter value according to an embodiment of the present disclosure.

For example, as shown in FIG. 4, the bit length of the LCID is 6, the allowed bit length of the first BEARER parameter value is 5, and 5 bit values can be cut from the LCID as the first BEARER parameter value. For example, the 5 highest bit values (as can be seen from the example (a) in FIG. 4) or the 5 lowest bit values (as can be seen from the example (b) in FIG. 4) can be used as the first BEARER parameter value.

According to some other embodiments, the terminal device may truncate at least one lowest bit and at least one highest bit of the LCID and combine the at least one lowest bit and the at least one highest bit to form the first BEARER parameter value.

It should be understood that, in addition to truncating a part of the bit values, the LCID may be processed in other manners. For example, a certain value may be subtracted from the value corresponding to the LCD, or the value corresponding to the LCID may be divided by a certain value, so as to obtain the first BEARER parameter value.

Alternatively, in some embodiments of the present disclosure, the terminal device may obtain the BEARER parameter value corresponding to the LCID corresponding to the transmitted data from a correspondence between at least one LCID and at least one BEARER parameter value, as the first BEARER Parameter value.

Specifically, LCIDs and BEARER parameter values may have a correspondence (for example, a one-to-one correspondence, a one-to-many correspondence, or a many-to-one correspondence). The correspondence may be preset on the terminal device, or the correspondence can be configured by the network device or by the group head of the terminal device group to which the terminal device belongs, or the correspondence can be negotiated between the sender and the receiver. The terminal device may obtain the BEARER parameter value corresponding to the LCID corresponding to the transmitted data from the correspondence as the first BEARER parameter value.

In another implementation, the terminal device may obtain the first BEARER parameter value based on the access communication standard adopted by the sidelink communication.

The terminal device obtains the BEARER parameter value corresponding to the access communication standard adopted by the sidelink communication from a correspondence between at least one access communication standard and at least one BEARER parameter value, as the first BEARER parameter value.

Access communication standards and BEARER parameter values may have a correspondence (for example, a one-to-one correspondence, a one-to-many correspondence, or a many-to-one correspondence). The correspondence may be preset on the terminal device, or the correspondence can be configured by the network device or by the group head of the terminal device group to which the terminal device belongs, or the correspondence can be obtained through negotiation between the sender and the receiver. The terminal device may also obtain the BEARER parameter value corresponding to the adopted access communication standard from the correspondence as the first BEARER parameter value.

The access communication standard mentioned in embodiments of the present disclosure may be an NR communication standard or an E-UTRA communication standard.

When the access communication standard adopted by the sidelink communication is the NR communication standard, the first BEARER parameter value can be a value. When the access communication standard adopted by the sidelink communication is the E-UTRA communication standard, the first The BEARER parameter value can be another value.

In another implementation, the terminal device may obtain the first BEARER parameter value based on the BEARER parameter value allocated for sidelink communication.

The BEARER parameter value allocated for the sidelink communication is allocated by a terminal device (for example, the terminal device that initiates the sidelink communication, the group head of the terminal device group to which the terminal device belongs in the sidelink communication); or the BEARER parameter value allocated for the sidelink communication is allocated by the network device.

The BEARER parameter value is allocated for the sidelink communication per logical channel, that is, the BEARER parameter value is allocated with a per-logical channel granularity. Specifically, the BEARER parameter value may be allocated when the LCD is allocated. Or, the BEARER parameter value is allocated for the sidelink communication per terminal device, that is, the BEARER parameter value is allocated with the per-terminal device granularity. When calculating MAC-I or XMAC-I, the BEARER parameter value allocated for the sending terminal is determined as the first BEARER parameter value; alternatively, the BEARER parameter value allocated for the receiving end terminal may be determined as the first BEARER parameter value.

In another implementation, the terminal device may determine the first BEARER parameter value based on the preset BEARER parameter value.

The terminal device may determine the preset BEARER parameter value as the first BEARER parameter value.

In 220, based on the first BEARER parameter value, the terminal device calculates MAC-I or XMAC-I for the sidelink communication.

After the sending end calculates the MAC-I, the calculated MAC-I can be encapsulated into the PDCP header. After the receiving end receives the message, the receiving end can calculate XMAC-I based on the received message and compare the XMAC-I with the MAC-I in the PDCP header. If the two values are equal, it means that the integrity protection is successful; otherwise, it means that the message content has been changed.

In some embodiments of the present disclosure, the bit length of the first BEARER parameter value is equal to a bit length of a second BEARER parameter value. The second BEARER parameter value is used to calculate MAC-I or XMAC-I in Uu interface communication. Embodiments of the present disclosure provide multiple implementations above to obtain the first BEARER parameter value, so that the bit length of the first BEARER parameter value can be equal to the bit length of the second BEARER parameter.

The bit length of the first BEARER parameter value and the bit length of the second BEARER parameter value may both be 5 bits. The terminal device may determine the bit length of the first BEARER parameter value based on the bit length of the second BEARER parameter value, and based on the determined bit length, the terminal device can process the LCD corresponding to the transmitted data, for example, a certain amount of bit values are truncated as the first BEARER parameter value.

The second BEARER parameter value may be a BEARER parameter value for non-access stratum (NAS) or a BEARER parameter value for access stratum (AS).

For example, for the NAS layer, the second BEARER parameter value may be a NAS connection identifier, and for 3GPP, the value may be 0X01, and for non-3GPP, the value may be 0XX00.

For another example, for the AS layer, for the integrity protection of the control plane, the second BEARER parameter value can be the value of a SRB identifier, or a certain number of bit values (for example, 0) can be padded before or after the SRB identifier (2 bits) to generate the second BEARER parameter value. For the integrity protection of the user plane, the second BEARER parameter value can be DRB, or the second BEARER parameter value can be obtained by processing the DRB identifier. For example, the value of DRB identifier is [1-32], and thus one can be subtracted from the value of the DRB identifier to form a 5-bit binary value as the second BEARER parameter value.

Therefore, in embodiments of the present disclosure, the bit length of the BEARER parameter value used to calculate MAC-I or XMAC-I in the sidelink communication is equal to the bit length of the BEARER parameter value used to calculate MAC-I or XMAC-I in the Uu interface communication. Embodiments of the present disclosure can avoid the problem of mismatch between MAC-I or XMAC-I calculations in the two communication modes, and only one set of MAC-I or XMAC-I calculation unit is needed, which reduces the complexity of terminal device implementations.

The first BEARER parameter value is obtained by the above-mentioned methods to make the bit length of the first BEARER parameter value equal to the bit length of the second BEARER parameter value. It is not necessary to change the architecture of the Uu interface communication for calculating the MAC-I or XMAC-I, and embodiments of the present disclosure can make full use of existing mechanisms and parameters and make minor changes to the existing mechanisms. For example, the existing BEARER parameter value is 5 bits, and the 5-bit BEARER parameter value is obtained by processing the LCD.

Figure 5:
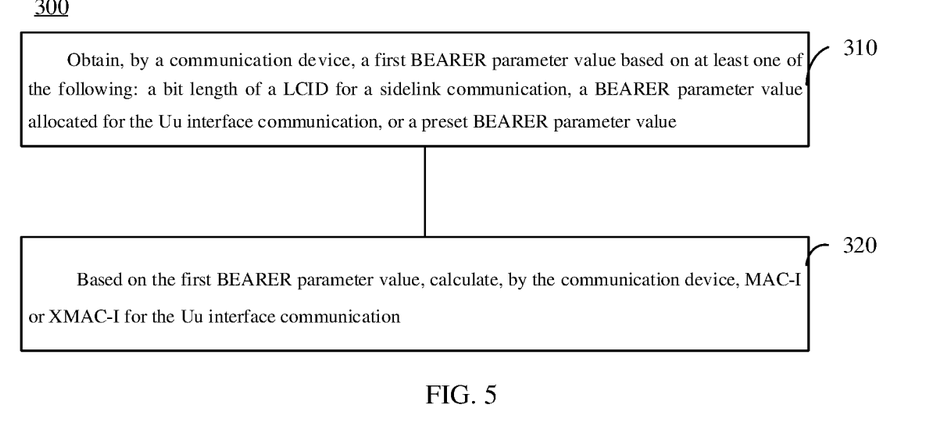
FIG. 5 is a schematic diagram of an integrity protection method for a Uu interface communication according to an embodiment of the present disclosure.

FIG. 5 is a schematic flowchart of an integrity protection method 300 for a Uu interface communication according to an embodiment of the present disclosure. The method 300 may be implemented by a terminal device or a network device. This method can be implemented by the receiving end of the communication or the sending end of the communication.

For example, when the Uu interface communication is used for uplink communication, the method 300 may be implemented by a terminal device. In this case, the terminal device is used to calculate MAC-I based on the first BEARER parameter value. Alternatively, when the Uu interface is used for uplink communication, the method 300 may be implemented by a network device. In this case, the network device may calculate XMAC-I based on the first BEARER parameter value.

For example, when the Uu interface communication is used for downlink communication, the method 300 can be implemented by a terminal device. In this case, the terminal device may calculate XMAC-I based on the first BEARER parameter value. Alternatively, when the Uu interface is used for downlink communication, this method can be implemented by a network device. In this case, the network device can calculate the MAC-I based on the first BEARER parameter value.

In embodiments of the present disclosure, the MAC-I or the XMAC-I is determined based on the first BEARER parameter value and based on at least one of the PDCP COUNT value, the communication direction of the Uu interface communication, the integrity protection key, the integrity protection key identifier or the content of the data packet.

In embodiments of the present disclosure, the bearer (BEARER) parameter value may be a parameter value used to obtain MAC-I or XMAC-I, and the bit length of the BEARER parameter value may be 5. The BEARER parameter value may be a parameter value with a fixed length, and the fixed length may be preset on the terminal device or may be configured by the network device for the terminal device. The BEARER parameter value may also have other names, such as a Logical Channel Identity (LCID) parameter value (for example, when the parameter value is obtained based on the LCID), a Data Radio Bearer (DRB) parameter value or a Signaling Radio Bearer (SRB) parameter value, or an input parameter value, etc., which are not specifically limited in embodiments of the present disclosure.

The BEARER parameter value along with other parameters can be used to obtain MAC-I or XMAC-I.

The other parameters may include at least one of the PDCP count (COUNT) value, the direction of the Uu interface communication, the integrity protection key, the integrity protection key identifier, or the content of the data packet (for example, Radio Resource Control (RRC) message). In embodiments of the present disclosure, the algorithm for calculating MAC-I or XMAC-I may be the NIA algorithm.

For example, as shown in FIG. 3, the PDCP COUNT value, the direction, the integrity protection key, the BEARER parameter value, and integrity protection key can be input in the calculation unit to obtain MAC-I or XMAC-I.

The PDCP COUNT value can include 32 bits.

The bit length of the integrity protection key can be 128 bits, which can be derived from the original key (KgNB).

The direction of the Uu interface communication can be represented by 1 bit, for example, 0 for uplink and 1 for downlink.

In 310, the communication device obtains the first BEARER parameter value based on at least one of the following:

a bit length of a logical channel identity (LCD) for a sidelink communication, a BEARER parameter value allocated for the Uu interface communication, or a preset BEARER parameter value.

In an implementation, the communication device may obtain the first BEARER parameter value based on the bit length of the LCID used for the sidelink communication.

The communication device may process the radio bearer identity of the Uu interface communication based on the bit length of the LCID to obtain the first BEARER parameter value which has a bit length that is the same as the bit length of the LCD.

The processing of the radio bearer identity includes adding at least one zero before the radio bearer identity, or adding at least one zero after the radio bearer identity.

For example, a specific value may be added before or after the DRB identifier, so that the bit length of the second BEARER parameter is equal to the bit length of the LCID for the sidelink communication. The bit length of the LCID for the sidelink communication may be equal to the bit length of the BEARER parameter value used to calculate the MAC-I or XMAC-I in the sidelink communication.

In embodiments of the present disclosure, the terminal device may obtain the first BEARER parameter value based on the bit length of the BEARER parameter value used to calculate the MAC-I or XMAC-I in the sidelink communication.

The bit length of the BEARER parameter used to calculate MAC-I or XMAC-I in the sidelink communication or the bit length of the LCID used for sidelink communication can be 6.

In another implementation, the communication device may obtain the first BEARER parameter value based on the BEARER parameter value allocated for Uu interface communication.

The BEARER parameter value is allocated for Uu interface communication with a per-terminal-device granularity or may be allocated with a per-radio-bearer granularity.

Among BEARER parameter values which are allocated for the Uu interface communication per radio bearer ID (i.e., with a per-radio bearer ID granularity), the communication device may determine the BEARER parameter value corresponding to the radio bearer ID used for the Uu interface communication as the first BEARER parameter value.

Alternatively, the communication device may determine a BEARER parameter value allocated for the Uu interface communication per terminal device (i.e., with a per-terminal-device granularity) as the first BEARER parameter value.

In another implementation, the communication device may obtain the first BEARER parameter value based on the preset BEARER parameter value.

The communication device may determine the preset BEARER parameter value as the first BEARER parameter value.

In the method 300, the first BEARER parameter value can be a BEARER parameter value for the AS layer or a BEARER parameter value for the NAS layer, and the BEARER parameter values of the AS layer and the NAS layer may be the same or different. The method of obtaining the BEARER parameter value for the AS layer and the method of obtaining the BEARER parameter value for the NAS layer may be the same or different.

In 320, based on the first BEARER parameter value, the communication device calculates MAC-I or XMAC-I for the Uu interface communication.

After the sending end calculates the MAC-I, the calculated MAC-I can be encapsulated into the PDCP header. After the receiving end receives the message, the receiving end can calculate XMAC-I based on the received message and compare the XMAC-I with the MAC-I in the PDCP header. If the two values are equal, it means that the integrity protection is successful; otherwise, it means that the message content has been changed.

In embodiments of the present disclosure, the bit length of the first BEARER parameter value is equal to the bit length of the second BEARER parameter value, and the second BEARER parameter value is used to calculate MAC-I or XMAC-I in the sidelink communication.

Therefore, in embodiments of the present disclosure, the bit length of the BEARER parameter value used to calculate MAC-I or XMAC-I in the sidelink communication is equal to the bit length of the BEARER parameter value used to calculate MAC-I or XMAC-I in the Uu interface communication. Embodiments of the present disclosure can avoid the problem of mismatch between MAC-I or XMAC-I calculations in the two communication modes, and only one set of MAC-I or XMAC-I calculation unit is needed, which reduces the complexity of terminal device implementations.

It should be understood that the above method 200 and method 300 can be used in combination. For example, for the same terminal device, the method 200 can be adopted as the method for obtaining the BEARER parameter value used to calculate MAC-I or XMAC-I in the sidelink communication, and the method 300 can adopted as the method for obtaining the BEARER parameter value used to calculate the MAC-I or XMAC-I in the Uu interface communication.

Figure 6:
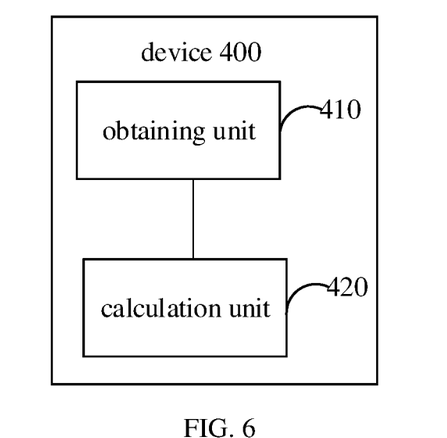
FIG. 6 is a schematic diagram of an integrity protection device for a sidelink communication according to an embodiment of the present disclosure.

FIG. 6 is a schematic diagram of an integrity protection device 400 for a sidelink communication according to an embodiment of the present disclosure. The device 400 includes an obtaining unit 410 and a calculation unit 420.

The obtaining unit 410 is configured to obtain a first BEARER parameter value based on at least one of the following: a logical channel identity (LCID) corresponding to data transmitted in the sidelink communication, an access communication standard adopted by the sidelink communication, a BEARER parameter value allocated for the sidelink communication, or a preset BEARER parameter value, wherein a bit length of the LCID corresponding to the transmitted data is greater than a bit length of the first BEARER parameter value.

The calculation unit 420 is configured to, based on the first BEARER parameter value, calculate a Message Authentication Code-Integrity (MAC-I) or an eXpected Message Authentication Code-Integrity (XMAC-I) for the sidelink communication.

According to embodiments of the present disclosure, the bit length of the first BEARER parameter value is equal to a bit length of a second BEARER parameter value, and the second BEARER parameter value is used to calculate MAC-I or XMAC-I in Uu interface communication.

According to embodiments of the present disclosure, the obtaining unit 410 is further configured to: process the LCID corresponding to the transmitted data to obtain the first BEARER parameter value.

According to embodiments of the present disclosure, the first BEARER parameter value is obtained in the following manner: truncating a part of bit values of the LCID corresponding to the transmitted data to generate the first BEARER parameter value.

According to embodiments of the present disclosure, the first BEARER parameter value is obtained in the following manner: truncating N lowest bit values or N highest bit values of the LCID corresponding to the transmitted data to generate the first BEARER parameter value.

According to embodiments of the present disclosure, N is equal to an amount of bits of the first BEARER parameter value.

According to embodiments of the present disclosure, the obtaining unit 410 is further configured to: from a correspondence between at least one LCID and at least one BEARER parameter value, obtain a BEARER parameter value corresponding to the LCID corresponding to the transmitted data as the first BEARER parameter value.

According to embodiments of the present disclosure, the obtaining unit 410 is further configured to: from a correspondence between at least one access communication standard and at least one BEARER parameter value, obtaining a BEARER parameter value corresponding to the access communication standard adopted by the sidelink communication as the first BEARER parameter value.

According to embodiments of the present disclosure, the BEARER parameter value allocated for the sidelink communication is allocated by a terminal device; or the BEARER parameter value allocated for the sidelink communication is allocated by a network device.

According to embodiments of the present disclosure, the obtaining unit 410 is further configured to: determine the preset BEARER parameter value as the first BEARER parameter value.

According to embodiments of the present disclosure, the MAC-I or the XMAC-I is calculated based on the first BEARER parameter value and based on at least one of a Packet Data Convergence Protocol (PDCP) COUNT value, a direction of the sidelink communication, an integrity protection key, an integrity protection key identifier, and a packet content.

It should be understood that the device 400 can be used to implement the corresponding operations in the above method 200. For brevity, details are not repeated here.

Figure 7:
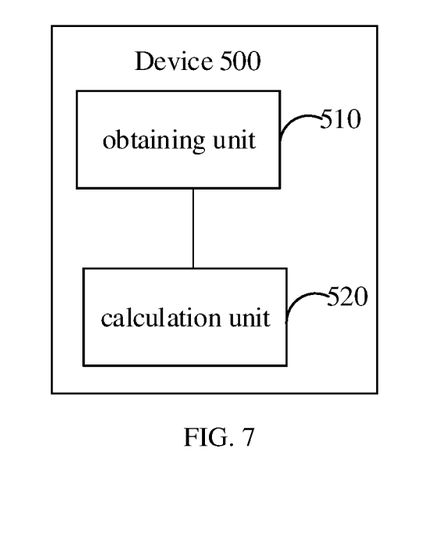
FIG. 7 is a schematic diagram of an integrity protection device for a Uu interface communication according to an embodiment of the present disclosure.

FIG. 7 is a schematic diagram of an integrity protection device 500 for a Uu interface communication according to an embodiment of the present disclosure. The device 500 includes an obtaining unit 510 and a calculation unit 520.

The obtaining unit 510 is configured to obtain a first BEARER parameter value based on at least one of the following: a bit length of a logical channel identity (LCID) for a sidelink communication, a BEARER parameter value allocated for the Uu interface communication, or a preset BEARER parameter value.

The calculation unit 520 is configured to, based on the first BEARER parameter value, calculate a Message Authentication Code-Integrity (MAC-I) or an eXpected Message Authentication Code-Integrity (XMAC-I) for the Uu interface communication.

According to embodiments of the present disclosure, a bit length of the first BEARER parameter value is equal to a bit length of a second BEARER parameter value, and the second BEARER parameter value is used to calculate MAC-I or XMAC-I in the sidelink communication.

According to embodiments of the present disclosure, the obtaining unit 510 is further configured to: based on the bit length of the LCD, process a radio bearer identity of the Uu interface communication to obtain the first BEARER parameter value, a bit length of which is the same as the bit length of the LCD.

According to embodiments of the present disclosure, processing of the radio bearer identity includes adding at least one zero before the radio bearer identity, or adding at least one zero after the radio bearer identity.

According to embodiments of the present disclosure, the obtaining unit 510 is further configured to: among BEARER parameter values allocated for the Uu interface communication per radio bearer identity (i.e., with a per-radio-bear ID granularity), determine a BEARER parameter value corresponding to a radio bearer identity used for the Uu interface communication as the first BEARER parameter value.

According to embodiments of the present disclosure, the obtaining unit 510 is further configured to: determine a BEARER parameter value allocated for the Uu interface communication per terminal device (i.e., with a per-terminal-device granularity) as the first BEARER parameter value.

According to embodiments of the present disclosure, the obtaining unit 510 is further configured to: determine the preset BEARER parameter value as the first BEARER parameter value.

According to embodiments of the present disclosure, the MAC-I or the XMAC-I is calculated based on the first BEARER parameter value and based on at least one of a Packet Data Convergence Protocol (PDCP) COUNT value, a communication direction of the Uu interface communication, an integrity protection key, an integrity protection key identifier, and a packet content.

It should be understood that the device 500 can be used to implement the corresponding operations in the above method 300. For brevity, details are not repeated here.

Figure 8:
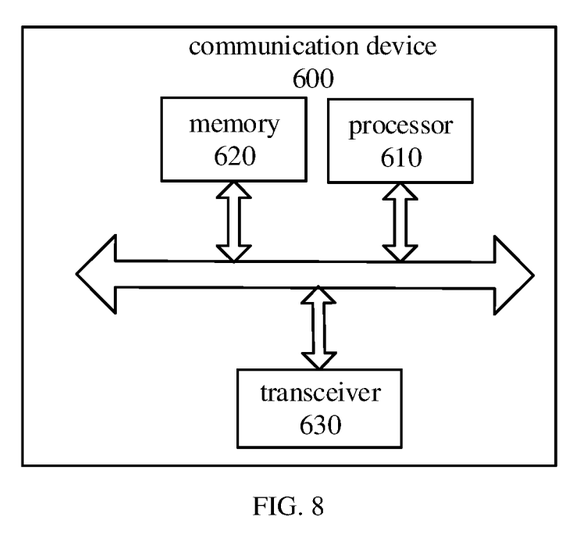
FIG. 8 is a schematic block diagram of a communication device according to an embodiment of the present disclosure.

FIG. 8 is a schematic structural diagram of a communication device 600 according to an embodiment of the present disclosure. The communication device 600 shown in FIG. 8 includes a processor 610, and the processor 610 may call and run a computer program from a memory to perform the method in embodiments of the present disclosure.

According to embodiments, as shown in FIG. 8, the communication device 600 may further include a memory 620. The processor 610 may call and run a computer program from the memory 620 to perform the method in embodiments of the present disclosure.

The memory 620 may be a separate device independent of the processor 610 or may be integrated in the processor 610.

According to embodiments, as shown in FIG. 8, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include one or more antennas.

According to embodiments, the communication device 600 may specifically be the network device in embodiments of the present disclosure, and the communication device 600 may implement the corresponding processes implemented by the network device in the method embodiments of the present disclosure. For brevity, details are not repeated here.

According to embodiments, the communication device 600 may specifically be the mobile terminal/terminal device according to an embodiment of the present disclosure, and the communication device 600 may implement the corresponding processes implemented by the mobile terminal/terminal device in the method embodiments of the present disclosure. For brevity, details are not repeated here.

Figure 9:
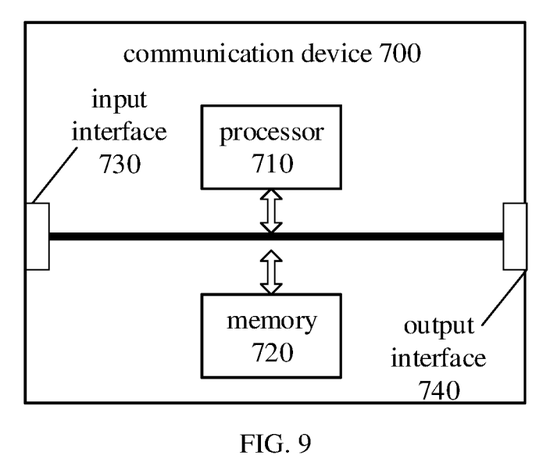
FIG. 9 is a schematic block diagram of a communication device according to an embodiment of the present disclosure.

FIG. 9 is a schematic structural diagram of a communication device 700 according to an embodiment of the present disclosure. The communication device 700 shown in FIG. 9 includes a processor 710, and the processor 710 can call and run a computer program from a memory to implement the method according to embodiments of the present disclosure.

According to embodiments, as shown in FIG. 9, the communication device 700 may further include a memory 720. The processor 710 may call and run a computer program from the memory 720 to implement the method according to embodiments of the present disclosure.

The memory 720 may be a separate device independent of the processor 710 or may be integrated in the processor 710.

According to embodiments, the communication device 700 may further include an input interface 730. The processor 710 may control the input interface 730 to communicate with other devices or communication devices, and specifically, the processor 710 can control the input interface to obtain information or data sent by other devices or communication devices.

According to embodiments, the communication device 700 may further include an output interface 740. The processor 710 can control the output interface 740 to communicate with other devices or c communication devices, and specifically, the processor 710 can control the output interface 740 to output information or data to other devices or communication devices.

According to embodiments, the communication device can be applied to the network device in embodiments of the present disclosure, and the communication device can implement the corresponding processes implemented by the network device in various methods according to embodiments of the present disclosure. For brevity, details are not repeated herein again.

According to embodiments, the chip can be applied to the mobile terminal/terminal device in embodiments of the present disclosure, and the communication device can implement the corresponding processes implemented by the mobile terminal/terminal device in various methods according to embodiments of the present disclosure. For brevity, details are not repeated herein again.

It should be understood that the communication device in the embodiments of the present disclosure may be a chip, and the chip may also be referred to as a system-level chip, a system chip, a chip system, or a system-on-chip, etc.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SL-DRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. An integrity protection method for a sidelink communication over a PC5 interface between a sender and a receiver, comprising:
    obtaining, by the sender or the receiver, a first BEARER parameter value based on a logical channel identity (LCID) corresponding to data transmitted in the sidelink communication, wherein a bit length of the LCID corresponding to the transmitted data is greater than a bit length of the first BEARER parameter value; and
    based on the first BEARER parameter value, calculating, by the sender or the receiver, a Message Authentication Code-Integrity (MAC-I) or an eXpected Message Authentication Code-Integrity (XMAC-I) for the sidelink communication; and
    performing integrity protection, by the sender or the receiver, on data packet using the calculated MAC-I or XMAC-I;
    wherein the first BEARER parameter value is obtained in the following manner: obtaining a part of bit values of the LCID corresponding to the transmitted data to generate the first BEARER parameter value.

2. The integrity protection method according to claim 1, wherein the first BEARER parameter value is obtained in the following manner: truncating N lowest bit values or N highest bit values of the LCID corresponding to the transmitted data to generate the first BEARER parameter value.

3. The integrity protection method according to claim 2, wherein N is equal to an amount of bits of the first BEARER parameter value.

4. The integrity protection method according to claim 3, wherein N is equal to 5.

5. The method according to claim 1, wherein performing integrity protection by the sender comprises:
    encapsulating by the sender the calculated MAC-I into a Packet Data Convergence Protocol (PDCP) header.

6. The method according to claim 1, wherein performing integrity protection by the receiver comprises:
    comparing by the receiver the calculate XMAC-I with MAC-I in a received PDCP header; and
    in response to that the calculate XMAC-I is equal to the MAC-I in the received PDCP header, determining that integrity protection is successful.

7. An integrity protection method for a Uu interface communication over a Uu interface between a terminal device and a network device, comprising:
    obtaining, by the terminal device or the network device, a first BEARER parameter value based on a bit length of a logical channel identity (LCID) for a sidelink communication; and
    based on the first BEARER parameter value, calculating, by the terminal device or the network device, a Message Authentication Code-Integrity (MAC-I) or an eXpected Message Authentication Code-Integrity (XMAC-I) for the Uu interface communication;
    performing integrity protection, by the terminal device or the network device, on data packet using the calculated MAC-I or XMAC-I;
    wherein obtaining the first BEARER parameter value comprises:
    based on the bit length of the LCID for the sidelink communication, processing a radio bearer identity of the Uu interface communication to obtain the first BEARER parameter value, a bit length of which is the same as the bit length of the LCID for the sidelink communication;
    wherein processing the radio bearer identity comprises: adding at least one zero before the radio bearer identity, or adding at least one zero after the radio bearer identity.

8. The method according to claim 7, wherein performing integrity protection comprises:
    encapsulating the calculated MAC-I into a Packet Data Convergence Protocol (PDCP) header.

9. The method according to claim 7, wherein performing integrity protection comprises:
    comparing the calculate XMAC-I with MAC-I in a received PDCP header;
    in response to that the calculate XMAC-I is equal to the MAC-I in the received PDCP header, determining that integrity protection is successful.

10. An integrity protection device for a sidelink communication over a PC5 interface between a sender and a receiver, comprising:
    a memory for storing computer programs; and
    a processor;
    wherein the processor is configured to execute the computer programs to:
    obtain a first BEARER parameter value based on a logical channel identity (LCID) corresponding to data transmitted in the sidelink communication, wherein a bit length of the LCID corresponding to the transmitted data is greater than a bit length of the first BEARER parameter value; and
    based on the first BEARER parameter value, calculate a Message Authentication Code-Integrity (MAC-I) or an eXpected Message Authentication Code-Integrity (XMAC-I) for the sidelink communication;
    perform integrity protection on data packet using the calculated MAC-I or XMAC-I;

wherein the first BEARER parameter value is obtained in the following manner: obtaining a part of bit values of the LCID corresponding to the transmitted data to generate the first BEARER parameter value.

11. The integrity protection device according to claim 10, wherein the first BEARER parameter value is obtained in the following manner: truncating N lowest bit values or N highest bit values of the LCID corresponding to the transmitted data to generate the first BEARER parameter value.

12. The integrity protection device according to claim 11, wherein N is equal to an amount of bits of the first BEARER parameter value.

13. The integrity protection device according to claim 12, wherein N is equal to 5.

14. The device according to claim 10, wherein when the device is the sender, the processor is configured to execute the computer programs to encapsulate the calculated MAC-I into a Packet Data Convergence Protocol (PDCP) header.

15. The device according to claim 10, wherein when the device is the sender, the processor is configured to execute the computer programs to
compare the calculate XMAC-I with MAC-I in a received PDCP header; and
in response to that the calculate XMAC-I is equal to the MAC-I in the received PDCP header, determining that integrity protection is successful.

* * * * *